Feb. 3, 1942.                C. E. SMITH                 2,272,097

LENS ASSEMBLY FOR STRAIGHT LINE SCANNING

Filed Feb. 29, 1940

WITNESSES:

INVENTOR
Clyde E. Smith.
BY
ATTORNEY

Patented Feb. 3, 1942

2,272,097

UNITED STATES PATENT OFFICE 2,272,097

LENS ASSEMBLY FOR STRAIGHT LINE SCANNING

Clyde E. Smith, Edgewood, Pa., assignor to Westinghouse Electric & Manufacturing Company, East Pittsburgh, Pa., a corporation of Pennsylvania Application February 29, 1940, Serial No. 321,476

11 Claims. (Cl. 88—14)

My invention relates to photo-sensitive apparatus and has particular relation to apparatus for inspecting an article to detect a heterogeneity in its surface.

At the present time cold-rolled sheet metal is used widely in the canning industry. Since the cans into which the sheet is formed are used for preserving food, uncertainty that a can is hermetically sealed is out of the question. A single leaky can in a carload may result in the rejection of the whole carload, and thus in a large financial loss to the canner. Tiny pin holes often occur in the cold-rolled sheets and to prevent the perforated sheet from being inadvertently used for canning purposes the sheet is subjected to inspection.

For the purpose of detecting the pin holes, the sheet is advanced from the rolling mill or a supply reel through a photo-sensitive system. When a pin hole is present in any portion of the sheet, light from a source penetrates the sheet and energizes the photo-sensitive system, which in turn causes a suitable marker to operate. The sheet is of substantial width and a plurality of photo-sensitive cells are used to cover the necessary optic field. The radiation from the sheet is projected on each cell through a suitable condensing lens.

In experimenting with the prior art inspecting apparatus just described, I have found that it is relatively unreliable. On numerous occasions the marker fails to operate when sheets having pin holes pass through the apparatus. Examination of the holes reveals that the failure cannot be ascribed to insufficient sensitivity in the system. The failure, moreover, occurs so frequently that it cannot be ascribed to accident.

It is, accordingly, an object of my invention to provide reliable apparatus for detecting the presence of pin holes in sheets.

Another object of my invention is to provide article inspecting apparatus that shall operate without fail when there is a heterogeneity in the surface of an article.

More generally stated, it is an object of my invention to provide reliable photo-sensitive inspecting apparatus for moving articles.

My invention arises from the realization that the inconsistency in the operation of the inspection apparatus arises from the manner in which the inspection lenses are arranged. The successive lenses of the inspection system are in contact with each other and the lines tangent to the pairs of adjacent lenses at the region of contact are parallel to the direction of motion of the sheet. Under such circumstances pin holes in the sheet, which lie so that their traces pass between the lenses as the sheet moves over the lenses, are not detected.

In accordance with my invention, the lenses are so arrayed that the trace of a heterogeneity which passes through the region between any two lenses first passes over one of the lenses and then over the other. Where cylindrical lenses are used, this object may be accomplished by arranging successive lenses in contact with each other but with their boundary lines at a substantial angle to the direction of motion of the article. Where spherical lenses are used, successive lenses are arranged in contact with each other but the line tangent to the contact point of any two lenses is at a substantial angle to the direction of motion of the article.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which:

Fig. 4 is a diagrammatic view showing in outline form an inspecting system embodying my invention.

Figure 1:
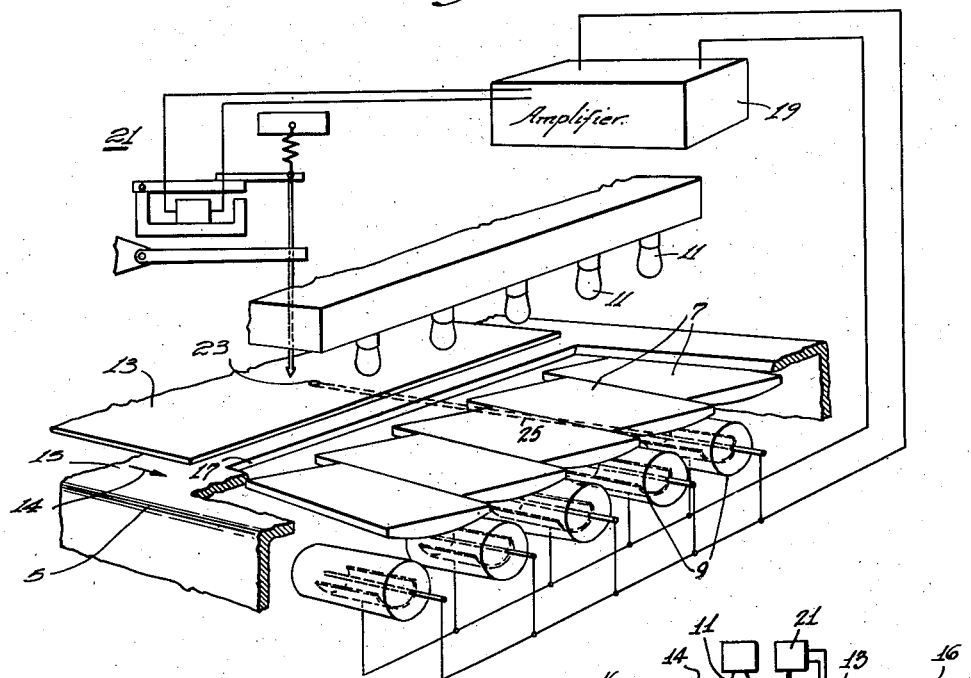
Figure 1 is a diagrammatic view showing an embodiment of my invention.
Figure 2:
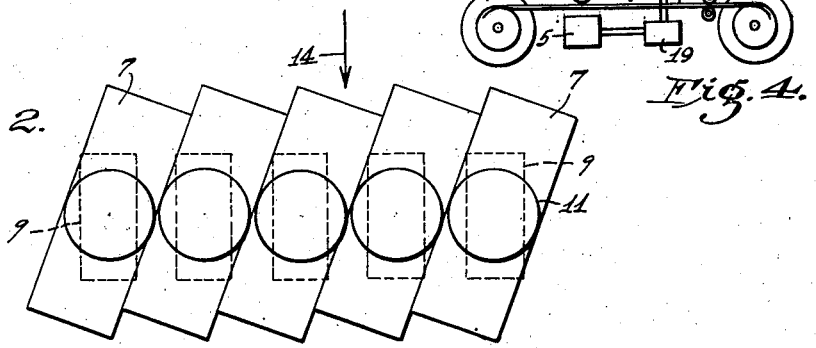
Fig. 2 is a diagrammatic view in plan of the embodiment shown in Fig. 1.

The apparatus shown in Figs. 1 and 2 comprises a container 5 (shown only in part) within which a plurality of lenses 7 and a plurality of photo-sensitive devices 9 are suitably mounted. Since the mounting does not concern the present invention, it is not illustrated. The proto-sensitive devices 9 may be photo-electric cells of the usual type, photo-voltaic cells, or any other radiation responsive elements.

Above the container 5 a plurality of sources 11 of radiant energy are disposed. The sheet 13 to be inspected is moved ordinarily, in the direction of the arrow 14, between the sources 11 and the top 15 of the container 5. The inspection may take place as the sheet 13 moves from a rolling mill to a storing reel 16 or from one storing reel to another as shown in Fig. 4. One of the reels may be power driven or other means employed to move the sheet in the desired direction.

In accordance with the preferred practice of my invention, the sources are incandescent tungsten lamps of high candle power. However, other sources of radiant energy such as lamps rich in infra-red and ultra-violet radiations are contemplated as falling within the scope of my invention.

The top 15 of the container 5 is provided with a relatively narrow slot 17 which should be of the order of one-fourth inch in width and of sufficient length to cover the whole width of the sheet 13. Any radiation which penetrates the sheet 13 passes through the slot 17 and the lenses 7 and impinges on the photo-sensitive devices 9. When any one of the devices 9 is energized, an energizing impulse is impressed on an amplifier 19, and a marker 21 is actuated to indicate the presence of a perforation in the sheet.

The photo-sensitive devices 9 are arranged in array so as to cover the whole width of the sheet 13, and a lens 7 is associated with each photo-sensitive device. In accordance with the preferred practice of my invention, the lenses 7 are of the cylindrical type and successive lenses are disposed with their linear edges in contact. The lines of contact between the lenses are parallel but inclined at a substantial angle to the direction of motion of the sheet. The angle between the lines of contact between the lenses and the direction of motion of the sheet should preferably be less than 90° but greater than 10°.

With the boundaries between the lenses inclined to the direction of motion of the sheet, a pin hole, the trace of which passes through the region between two successive lenses as the sheet moves, has a trace which passes first over one lens and then over the other. This situation is illustrated in the drawing by a pin hole 23 in the sheet, the trace of which passes over the region between the third lens and the fourth lens from the left. The broken lines 25 extending from the pin hole represent the line traced by the hole as the sheet moves, and it will be noted that this line passes first over the third lens and then over the fourth lens. As the pin hole passes over the two lenses in succession, the light transmitted through the lenses is projected first on the photocell corresponding to the third lens and then on the photocell corresponding to the fourth lens, and the marker 21 is actuated as required.

Figure 3:
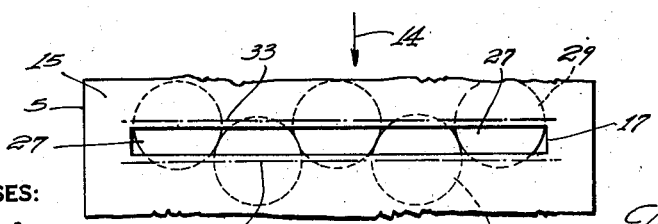
Fig. 3 is a diagrammatic view illustrating the essential features of a modification of my invention.

The situation when spherical lenses 27 are used is illustrated in Fig. 3. In this case the lenses are arrayed staggered in two groups 29 and 31. The optic axes of the lenses 27 of the two groups lie in parallel planes which bound the slot 17 through which the radiation is admitted. The traces of the planes are represented by dash-dot lines 33 and 35 in Fig. 3. The lenses 27 of one group 29 extend from one end of the slot 17 to the other. The lenses of the other group 31 are interposed between the lenses of the first group, each lens of the former group being tangent to two successive lenses of the latter group. The regions in which the lenses are tangent lie substantially in the center of the slot 17 and the tangent lines at the points of contact between the lenses are at a substantial angle to the direction of motion of the lenses. Since the lenses overlap the trace of every point in the surface of the sheet under observation must pass through the optic surface of at least one lens.

While my invention has been shown herein as applied to an inspection system in which the heterogeneities are detected by transmitted radiation systems in which reflected radiation is utilized lie within the scope of my invention.

Although I have shown and described certain specific embodiments of my invention, I am fully aware that many modifications thereof are possible. My invention, therefore, is not to be restricted except insofar as is necessitated by the prior art and the spirit of the appended claims.

I claim as my invention:

1. For use in the inspecting of an article, the combination comprising means for projecting radiation on said article, radiation responsive means having spaced areas of high sensitivity and intermediate areas of less sensitivity, means including a plurality of lenses for projecting the resultant radiation emitted by said article on said areas of high sensitivity, and means for effecting relative movement in a fixed direction of said article and said lenses, said lenses being so positioned with respect to said fixed direction that each of said lenses directs said radiation onto a corresponding area of high sensitivity and so arranged that a point in the surface of said article the trace of which passes over the region between at least two of said lenses as a result of said relative movement, projects resultant radiation first on one of said two lenses and then on the other.

2. For use in inspecting an article, the combination comprising means for projecting radiation on said article, radiation responsive means having spaced areas of high sensitivity and intermediate areas of less sensitivity, means including a plurality of lenses for projecting the resultant radiation emitted by said article on said areas of high sensitivity, and means for effecting relative movement in a fixed direction of said article and said lenses, said lenses being so positioned with respect to said fixed direction that each of said lenses directs said radiation onto a corresponding area of high sensitivity, and successive lenses being tangent to each other and the lines of tangency between said lenses being at a substantial angle to said direction of said relative movement.

3. For use in the inspecting of an article, the combination comprising means for projecting radiation on said article, radiation responsive means, including a plurality of radiation responsive cells disposed in an array to cover the field of said article, the spaces between the sensitive surfaces of said cells constituting dead regions from which there is no response if radiant energy impinges thereon, means including a plurality of lenses for projecting the resultant radiation emitted by said article on said responsive means, means for effecting relative movement in a fixed direction of said article and said lenses, said lenses being disposed in an array corresponding to said cells with the lines between said lenses passing over said dead regions, each of said lenses directing said radiation onto a corresponding cell and away from dead regions adjacent said cell and said lenses being so positioned with respect to said fixed direction that a point in the surface of said article the trace of which passes over the region between at least two of said lenses and over said dead regions as a result of said relative movement projects resultant radiation first on one of said two lenses and then on the other.

4. For use in the inspecting of an article, the combination comprising means for projecting radiation on said article, radiation responsive means, including a plurality of radiation responsive cells disposed in an array to cover the field of said article, the spaces between the sensitive surfaces of said cells constituting dead regions from which there is no response if radiant energy impinges thereon, means including a plurality of lenses for projecting the resultant radiations emitted by said article on said responsive means, and means for effecting relative movement in a fixed direction of said article and said lenses, said lenses being disposed in an array corresponding to said cells with the lines between said lenses passing over said dead regions, each of said lenses directing said radiation onto a corresponding cell and away from dead regions adjacent said cell, and successive lenses being tangent to each other and the lines of tangency between lenses being at a substantial angle to said direction of relative movement.

5. For use in the inspecting of sheet material of substantial width, the combination comprising means for projecting radiation on said material, radiation responsive means, including a plurality of radiation responsive cells disposed in an array to cover the field of said material, the spaces between the sensitive surfaces of said cells constituting dead regions from which there is no response if radiant energy impinges thereon, means including a plurality of lenses for projecting the resultant radiations emitted by said material on said responsive means, and means for effecting relative movement in a fixed direction of said material and said lenses, said lenses being disposed in an array corresponding to said cells with the lines between said lenses passing over said dead regions, each of said lenses directing said radiation onto a corresponding cell and away from dead regions adjacent said cell, and said lenses being so arranged with respect to said fixed direction that a point in the surface of said material, the trace of which passes over the dead region between at least two of said lenses as a result of said relative movement, projects resultant radiation first on one of said lenses and then on the other.

6. For use in the inspecting of an article, the combination comprising means for projecting radiation on said article, radiation responsive means having spaced areas of high sensitivity with intermediate areas of less sensitivity disposed to be excited by radiation transmitted through said article, means including a plurality of lenses for projecting the radiation transmitted through said article on said areas of high sensitivity, and means for effecting relative movement in a fixed direction of said article and said lenses, said lenses being so positioned with respect to said fixed direction that each of said lenses directs said radiation onto a corresponding area of high sensitivity and so arranged that a point in the surface of said article the trace of which passes over the region between at least two of said lenses as a result of said relative movement, projects resultant radiation first on one of said two lenses and then on the other.

7. For use in the inspecting of sheet material of substantial width, the combination comprising means for projecting radiation on said material, radiation responsive means disposed to be excited by radiation transmitted through said material and having spaced areas of high sensitivity with intermediate areas of less sensitivity, means including a plurality of lenses for projecting the radiation transmitted through said material on said areas of high sensitivity, and means for effecting relative movement in a fixed direction of said material and said lenses, said lenses being so positioned with respect to said fixed direction that each of said lenses directs said radiation onto a corresponding area of high sensitivity and so arranged that a point in the surface of said material the trace of which passes over the region between at least two of said lenses as a result of said relative movement projects resultant radiation first on one of said two lenses and then on the other.

8. For use in inspecting an article by utilizing the radiant energy emitted from said article, the combination comprising radiant energy responsive means having spaced areas of high sensitivity and intermediate areas of less sensitivity, means including a plurality of lenses disposed to cover the optic field of said article, for projecting the radiant energy emitted by said article on said areas of high sensitivity, and means for effecting relative movement in a fixed direction of said article and said lenses, said lenses being so positioned that each of said lenses directs said radiant energy onto a corresponding area of high sensitivity, and being so arranged with respect to said fixed direction that substantially all points in the radiant energy emissive surface of said article, the traces of which pass over the region between at least two of said lenses as a result of said relative movement are capable of emitting radiation first on one of said last mentioned lenses and then on the other.

9. For use in inspecting an article by utilizing the radiant energy emitted from said article, the combination comprising radiant energy responsive means having spaced areas of high sensitivity and intermediate areas of less sensitivity, means including a plurality of cylindrical lenses disposed to cover the optic field of said article for projecting the radiant energy emitted by said article on said areas of high sensitivity, and means for effecting relative movement in a fixed direction of said article and said lenses, said lenses being so positioned that each of said lenses directs said radiant energy onto a corresponding area of high sensitivity and successive lenses being arranged in contact with each other with their longitudinal axes parallel and with their lines of contact at a substantial angle to said direction of said relative movement.

10. For use in inspecting an article by utilizing the radiant energy emitted from said article, the combination comprising radiant energy responsive means having spaced areas of high sensitivity and intermediate areas of less sensitivity, means including a plurality of spherical lenses disposed to cover the optic field of said article, for projecting the radiant energy emitted by said article on said areas of high sensitivity, and means for effecting relative movement in a fixed direction of said article and said lenses, said lenses being so positioned that each of said lenses directs said radiant energy onto a corresponding area of high sensitivity, and said lenses being arranged in a staggered array in groups with the optic axes of the lenses in the different groups lying along parallel lines and the individual lenses in the different groups overlapping.

11. For use in inspecting an article by utilizing the radiant energy emitted from said article, the combination comprising radiant energy responsive means having spaced areas of high sensitivity and intermediate areas of less sensitivity, means including a plurality of spherical lenses disposed to cover the optic field of said article, for projecting the radiant energy emitted by said article on said areas of high sensitivity, and means for effecting relative movement in a fixed direction of said article and said lenses, said lenses being so positioned that each of said lenses directs said radiant energy onto a corresponding area of high sensitivity, adjacent lenses being tangent to each other at points substantially displaced from the lines between the optic axes of each of said adjacent lenses and other lenses.

CLYDE E. SMITH.